(12) United States Patent
Rebholz-Goldmann et al.

(10) Patent No.: US 10,532,724 B2
(45) Date of Patent: Jan. 14, 2020

(54) METHOD FOR OPERATING A PARKING BRAKE AND CONTROL UNIT FOR OPERATING A PARKING BRAKE

(71) Applicant: Robert Bosch GmbH, Stuttgart (DE)

(72) Inventors: Peter Rebholz-Goldmann, Yokohama (JP); Toni Frenzel, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/978,912

(22) Filed: May 14, 2018

(65) Prior Publication Data

US 2018/0345938 A1   Dec. 6, 2018

(30) Foreign Application Priority Data

Jun. 1, 2017   (DE) .......................... 10 2017 209 314

(51) Int. Cl.
| | | |
|---|---|---|
| *B60T 17/22* | (2006.01) | |
| *B60T 13/74* | (2006.01) | |
| *B60T 17/18* | (2006.01) | |
| *B60T 7/02* | (2006.01) | |
| *G06F 17/00* | (2019.01) | |

(52) U.S. Cl.
CPC .............. *B60T 13/741* (2013.01); *B60T 7/02* (2013.01); *B60T 17/18* (2013.01); *B60T 2270/402* (2013.01)

(58) Field of Classification Search
CPC . B60T 7/02; B60T 7/042; B60T 7/107; B60T 8/17; B60T 13/74; B60T 13/741; B60T 17/18; B60T 17/221
USPC ................. 188/2 D, 156–164; 303/3, 15, 20; 701/70–72
See application file for complete search history.

(56) References Cited

U.S. PATENT DOCUMENTS

| | | | | |
|---|---|---|---|---|
| 2004/0201270 | A1* | 10/2004 | Suzuki ................. | B60T 13/741 303/20 |
| 2010/0204894 | A1* | 8/2010 | Strengert ............. | B60T 17/221 701/70 |
| 2011/0202246 | A1* | 8/2011 | Lindsay ................. | B60T 1/005 701/70 |
| 2011/0278108 | A1* | 11/2011 | Watanabe ............... | B60T 7/042 188/72.3 |
| 2013/0261917 | A1* | 10/2013 | Kotake ................. | B60T 13/741 701/70 |
| 2013/0282249 | A1* | 10/2013 | Heise ..................... | B60T 7/042 701/70 |
| 2015/0251639 | A1* | 9/2015 | Sautter ................... | B60T 8/174 701/70 |

(Continued)

FOREIGN PATENT DOCUMENTS

DE   10 2014 204 287 A1   9/2015

*Primary Examiner* — Christopher P Schwartz
(74) *Attorney, Agent, or Firm* — Maginot, Moore & Beck LLP (57) ABSTRACT

A method for operating an electric parking brake includes determining a fault relating to a first control unit which in a normal operating mode operates the electric parking brake. The method further includes operating a second control unit in an emergency operating mode as a function of the determined fault and determining a state for an operator control element of the parking brake using the second control unit and operating the parking brake as a first function of the determined state of the operator control element using the second control unit in the emergency operating mode.

8 Claims, 7 Drawing Sheets

(56) References Cited

U.S. PATENT DOCUMENTS

2018/0345947 A1* 12/2018 Rebholz-Goldmann .................... B60T 17/221

* cited by examiner

METHOD FOR OPERATING A PARKING BRAKE AND CONTROL UNIT FOR OPERATING A PARKING BRAKE

This application claims priority under 35 U.S.C. § 119 to patent application no. DE 10 2017 209 314.5 filed on Jun. 1, 2017 in Germany, the disclosure of which is incorporated herein by reference in its entirety.

The disclosure relates to a method for operating a parking brake and to a control device for operating the parking brake.

BACKGROUND

DE 10 2014 204 287 A1 discloses a method for operating a motor vehicle brake device which has at least one electronic parking brake with at least one actuator, wherein when a first switching signal is applied to a switching signal input the actuator is actuated in order to activate the parking brake. It is proposed that the switching signal input be enabled in a normal operating mode to apply any desired switching signals and be fixedly set, in a safety operating mode, to a second switching signal which is different from the first switching signal, with the result that the actuation of the actuator for activating the parking brake is prevented.

SUMMARY

The problem on which the disclosure is based is solved by a method and by a control unit according to the disclosure.

It is proposed that a fault relating to a first control unit which in a normal operating mode operates the electric parking brake is determined, that a second control unit of the control device is operated in an emergency operating mode as a function of the determined fault, that in the emergency operating mode the second control unit determines a state for an operator control element of the parking brake, and that in the emergency operating mode the second control unit operates the parking brake as a function of the state of the operator control element.

This provides a cost-effective solution for increasing the availability of the automatic parking brake for faults in the region of the first control unit. If a fault relating to the first control unit occurs, in the emergency operating mode the second control unit can ensure the stopping capability of the vehicle.

In particular, vehicles without a transmission interlock benefit from this embodiment, since the parking brake assumes the function of the transmission interlock here, i.e. of preventing the vehicle from rolling away. Of course, it is, however, also possible for vehicles to be operated with a transmission interlock with the proposed method. In particular, failures of the evaluation logic in the region of the first control unit and failures of the communication paths from/to the first control unit do not lead to a failure of the parking brake.

One advantageous embodiment is defined by the fact that the determined state of the operator control element constitutes closing of the parking brake, that the second control unit operates an actuator of the parking brake as a function of the determined state of the operator control element to close the parking brake, and that the second control unit switches off the actuator of the parking brake if an actuator current reaches a predetermined threshold value or is exceeded.

One advantageous embodiment is defined by the fact that the second control unit switches off the actuator of the parking brake if the actuator current reaches the predetermined threshold value or is exceeded for a predetermined minimum time period, in particular at least 30 ms.

One advantageous embodiment is defined by the fact that the determined state of the operator control element constitutes opening of the parking brake, that the second control unit operates an actuator of the parking brake as a function of the determined state of the operator control element to open the parking brake, and that the second control unit switches off the actuator after a predetermined time threshold value has been reached.

One advantageous embodiment is defined by the fact that in the normal operating mode the second control unit determines a state of the operator control element, and that in the normal operating mode the first control unit operates the parking brake as a function of the determined state of the operator control element.

BRIEF DESCRIPTION OF THE DRAWINGS

Further advantageous advantages and features of the disclosure can also be found in the following description and in the drawing. In the drawing.

DETAILED DESCRIPTION

Figure 1:
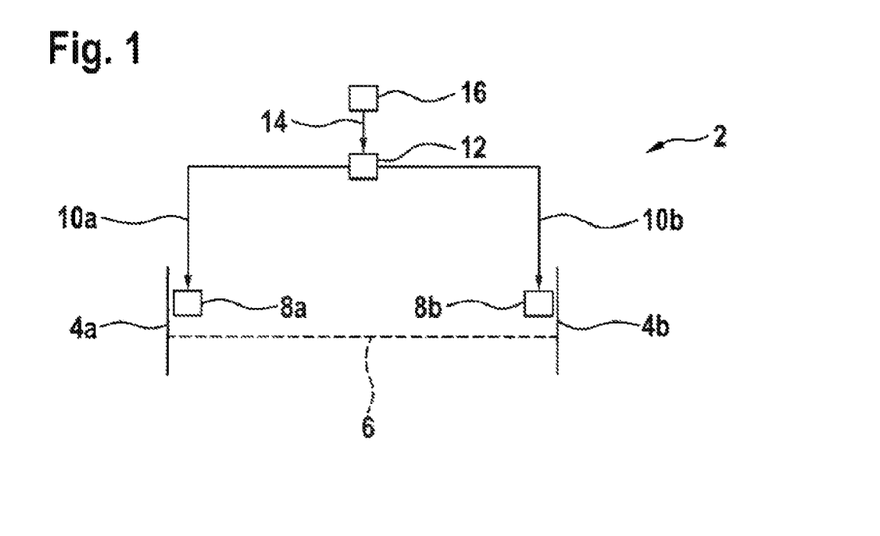
FIGS. 1, 3, 4 and 8 show a parking brake of a motor vehicle in a schematic form.

FIG. 1 shows a parking brake 2 of a motor vehicle in a schematic form. The parking brake 2 serves to continuously interlock the wheels 4a, 4b of a vehicle axle 6 of a motor vehicle and comprises a respective actuator 8a, 8b for this purpose. Control signals 10a and 10b are fed to the actuators 8a and 8b from a control device 12. The control device 12 determines the control signals 10a and 10b as a function of a state 14 of an operator control element 16. The operator control element 16 is arranged so as to be accessible to the vehicle driver. The state 14 of the operator control element 16 determines the actuation of the actuators 8a and 8b. Opening the parking brake 2 comprises enabling rotation of the wheels 4a and 4b. Closing of the parking brake 2 comprises locking the wheels 4a and 4b.

Figure 2:
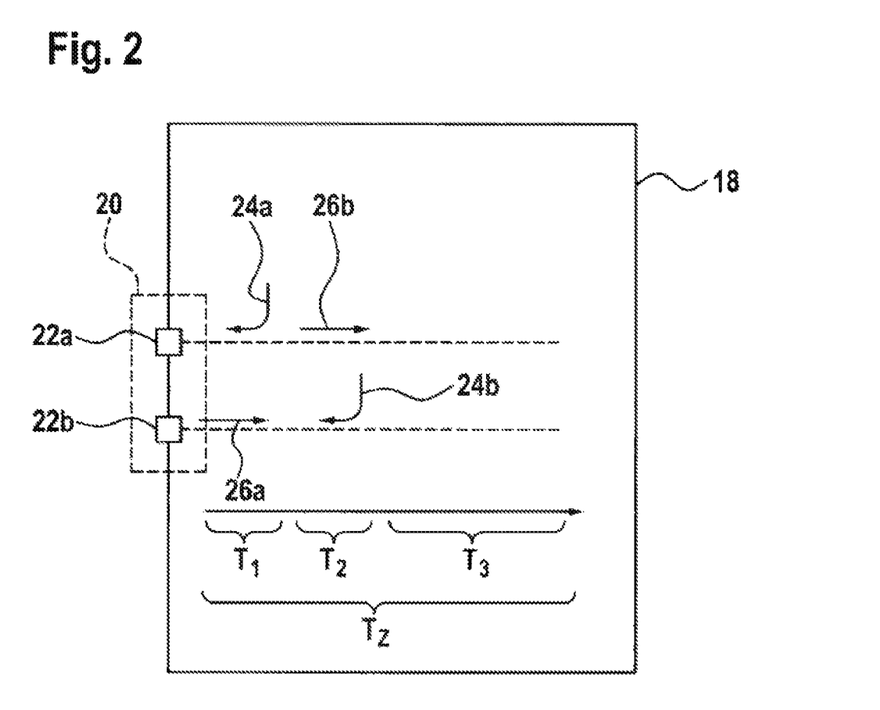
FIG. 2 shows an input unit of a control device in a schematic form.

FIG. 2 shows an input unit 18 of the control device 12 in a schematic form and serves to explain a method for operating the parking brake 2. The input unit 18 comprises an interface 20 for the operator control element 16. During a first time period T1 a change in current 24a is fed to a terminal 22a of the interface 20. During the feeding of the change in current 24a a current measurement 26a is carried out at a further terminal 22b. During a second time period T2 a change in current 24b is fed to the terminal 22b of the interface 20. During the feeding of the change in current 24b, a current measurement 26b is carried out at the terminal 22a. Therefore, a time sequence of changes in current 24a, 24b is fed to terminals 22a, 22b of the interface 20, and during the feeding of the respective change in current 24a, 24b at least one current measurement 26a, 26b is carried out at at least one terminal 22b, 22a. The electric parking brake 2 is operated, i.e. opened or closed, as a function of the current measurements 26a and 26b. For this purpose, a driver's request, which the driver specifies by means of the operator control element, is determined as a function of the current measurements 26a and 26b. Subsequently, the electric parking brake 2 is operated as a function of the driver's request.

The changes in current 24a and 24b comprise a change in the fed current from a first current level to a second current level. As an alternative to this, a change in current comprises an individual current pulse, wherein the current rises here from a current level and then returns to this current level in the sense of an individual current pulse. Of course, the proposed method is not limited to a number of two terminals 22a and 22b but rather usually comprises at least a number of four or six terminals 22.

During a further time period T3 changes in current are not fed to the interface 20. After a cycle time Tz the timing sequence of changes in current 24a and 24b and the associated current measurements 26a and 26b are repeated. The cycle time Tz varies in a range from 50 ms to 130 ms, in particular 90 ms. Of course, as an alternative to the cyclical execution of the changes in current 24a, 24b, a triggered execution can be carried out, wherein in this context the operator control element 16 is monitored for a change in state.

Figure 3:
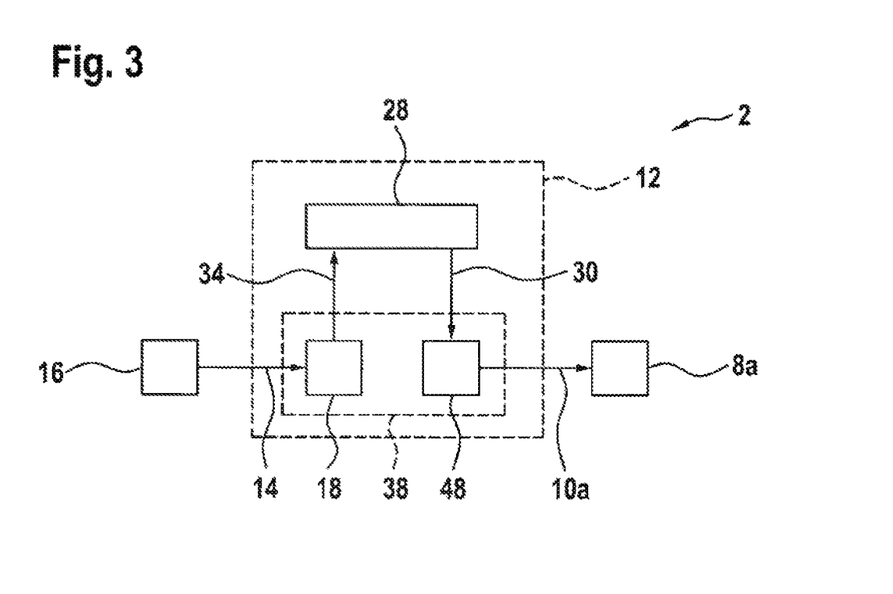

FIG. 3 shows a schematic block diagram of the parking brake 2 in a normal operating mode. The control device 12 comprises a first control unit 28 which is embodied, for example, as a microcontroller, and a second control unit 38. The second control unit 38 is preferably implemented as an application-specific integrated circuit, abbreviated as ASIC, but can, of course, also be embodied as a microcontroller. The second control unit 38 comprises the input unit 18 and an output unit 48. In the normal operating mode the input unit 18 determines the state 14 of the operator control element 16 and transmits it in the form of a state 34 to the first control unit 28. The state 34 corresponds to a determined driver's request which the driver specifies by means of the operator control element 16. The second control unit 38 and, in particular, the input unit 18 are pre-configured for various types of operator control element 16 and can therefore be used in a multiplicity of different operator control elements 16. The output unit 48 determines, as a function of an actuator command 30, at least one of the control signals 10a, 10b and feeds this at least one control signal 10a, 10b to the respective actuator 8a or 8b.

Figure 4:
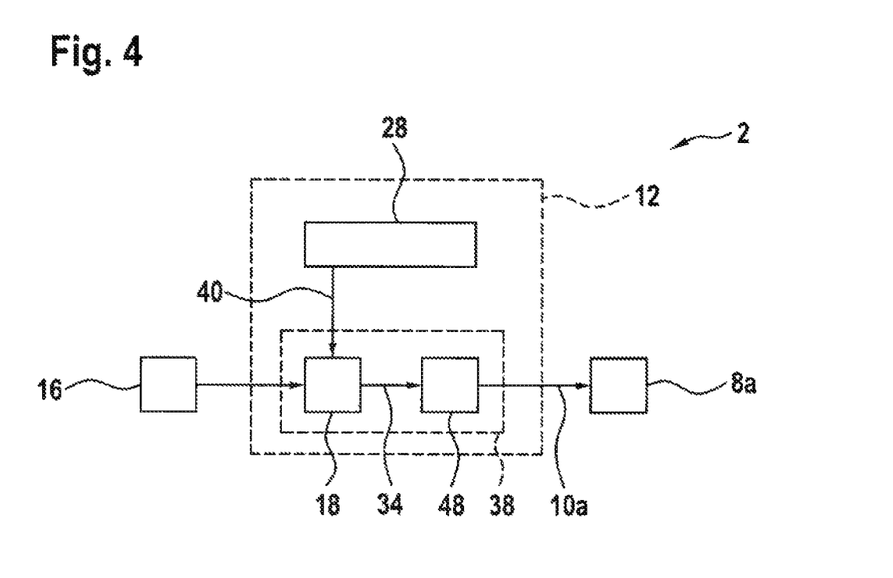

FIG. 4 shows a schematic block diagram of the parking brake 2 in an emergency operating mode. A fault 40 is determined with respect to the first control unit 28. The parking brake 2 and, in particular, the second control unit 38 go into an emergency operating mode as a function of the determined fault 40. In the emergency operating mode the input unit 18 determines the state 34 for the operator control element 16 and transmits it directly to the output unit 48. The output unit 48 determines at least one of the control signals 10a, 10b as a function of the state 34. Therefore, the second control unit 38 operates the parking brake 2 in the emergency operating mode as a function of the determined state 34 of the operator control element 16.

Figure 5:
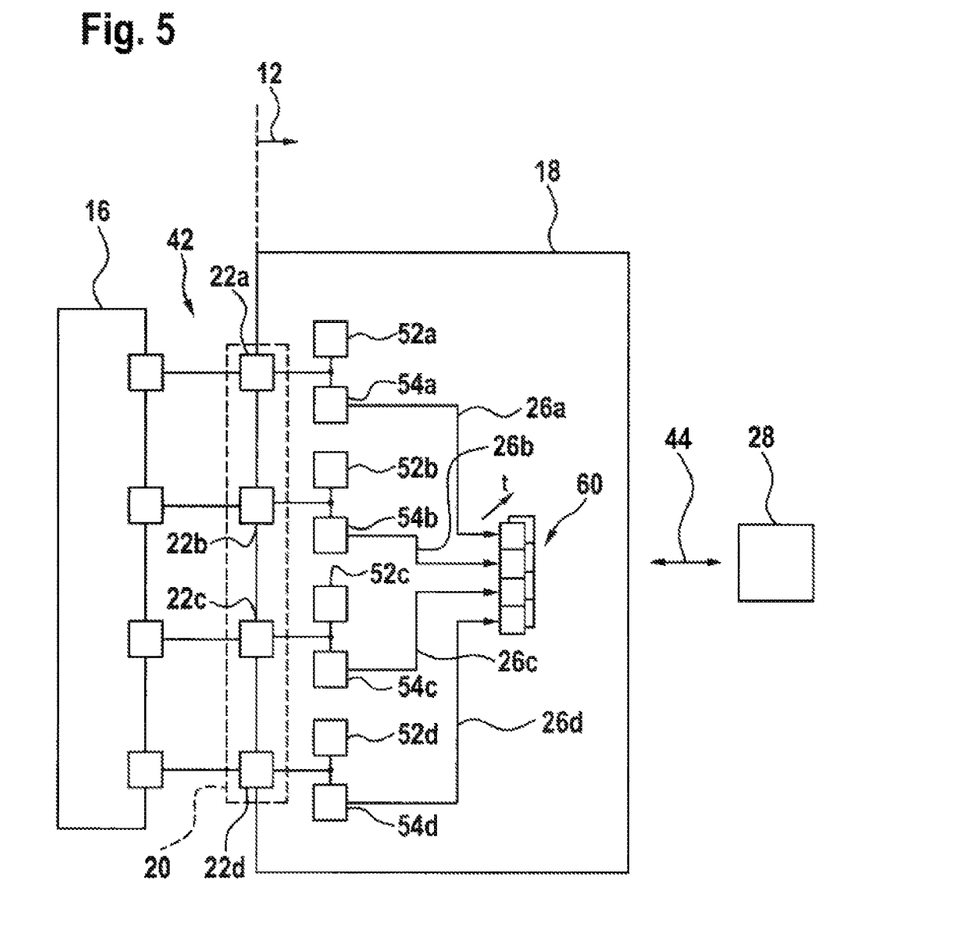
FIGS. 5 and 7 show a schematic block diagram of an operator control element, an input unit and a first control unit.

FIG. 5 shows a schematic block diagram with the operator control element 16, the input unit 18 and the first control unit 28. The operator control element 16 is connected to the interface 20 of the input unit 18 via a cable-bound line 42. The input unit 18 is connected to the first control unit 28 via a bus system 44, in particular an SPI (Serial Peripheral Interface) bus. Each individual terminal of the terminals 22a to 22d of the interface 20 is connected to a respective switchable power source 52a to 52d and to a respective current measuring element 54a to 54d. The power sources 52a to 52d are actuated in such a way that a timing sequence of changes in current 24 is fed to the terminals 22a to 22d. During this feeding of changes in current 24, the respective current measurement 26a to 26d is carried out by means of the current measuring elements 54a to 54d. These current measurements 26a to 26d are present as bit information. A bit pattern 60 is determined in this way in response to feeding of a change in current 24. A sequence of bit patterns 60 is determined in response to the number of changes in current 24. The bit patterns 60 are then available to the control unit 28 for evaluation. The driver's request is determined in the sense of "close parking brake" or "open parking brake" as a function of the bit patterns 60.

Figure 6:
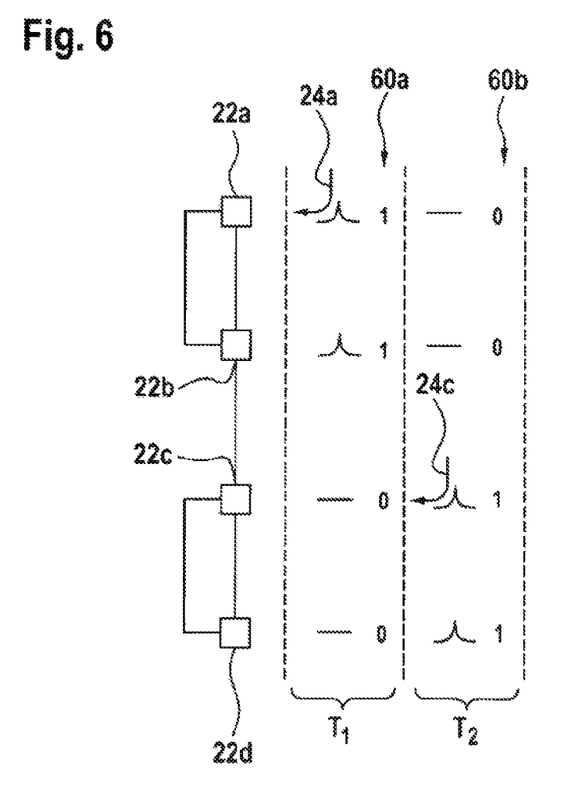
FIG. 6 shows a schematic sequence of changes in current.

FIG. 6 shows a schematic sequence of changes in current 24. For example, the operator control element 16 connects the terminals 22a and 22b and the terminals 22c and 22d in an electrically conductive fashion. During the first time period T1, a change in current in the form of a current pulse is fed to the terminal 22a, which can be detected during a current measurement at the terminal 22b on the basis of the electrically conductive connection between the two terminals 22a and 22b. Correspondingly, a first bit pattern 60a is obtained. A second bit pattern 60b is obtained in the second time period T2 in an analogous form.

Figure 7:
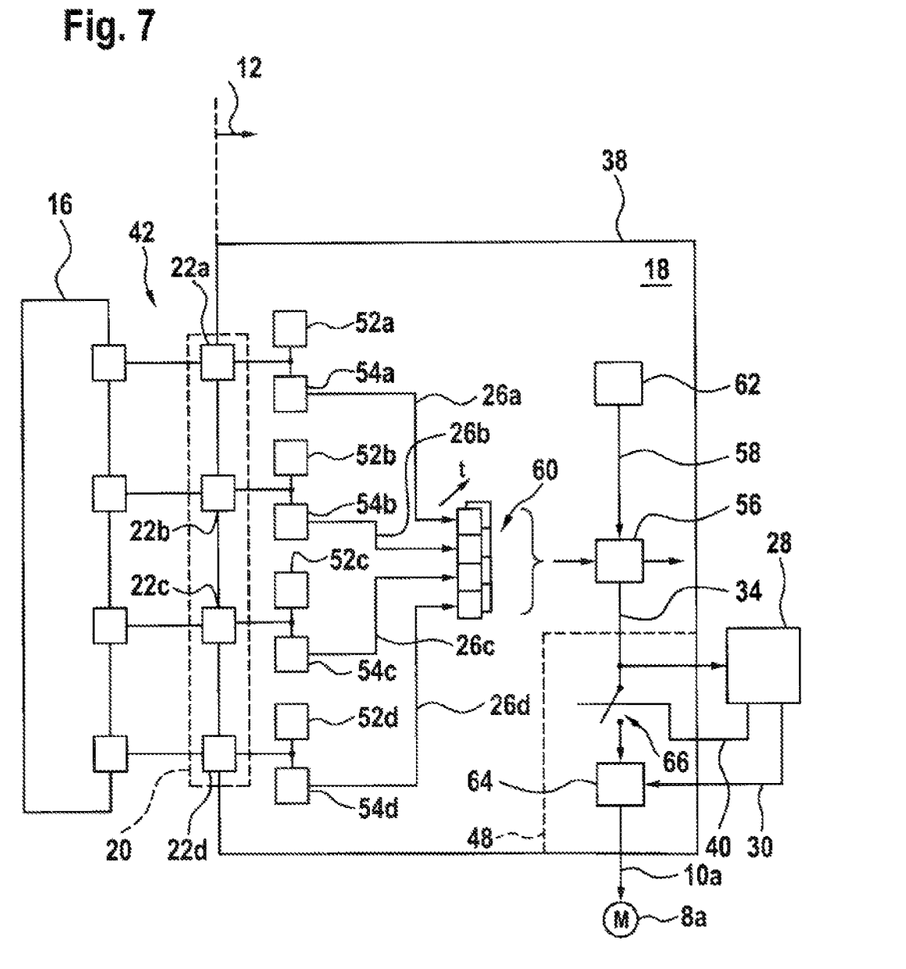

FIG. 7 shows a schematic block diagram by analogy with FIG. 5. In contrast to FIG. 5 the input unit 18 comprises a comparator unit 56 which compares the current measurements 26a to 26d in the form of the present bit pattern 60 with setpoint measurements 58 which are stored in a memory element 62. If the determined current measurements 26 correspond to setpoint measurements 58, a permissible to valid state 34 of the operator control element 16 is determined. If the current measurements 26 do not correspond to setpoint measurements 58 for a permissible state 34, a fault state is determined. The comparator unit 56 therefore determines the state 34 as a function of the comparison, and makes available said state to the first control unit 28.

As a function of the state 34, the first control unit 28 in the normal operating mode determines an actuator command 30 which is fed to an output stage unit 64. The output stage unit 64 determines the control signal 10a.

In addition to the feeding of changes in current and the simultaneous measurement, a constant signal level can be fed to one of the terminals 22a to 22d, wherein continuous monitoring is carried out at another of the terminals 22a to 22d. The continuous monitoring of this terminal comprises detecting reception or interruption of the signal level. The timing sequence of changes in current 24 and current measurements 26 is started as a function of the reception or the interruption of the signal level. This can take place in addition to or as an alternative to the cyclical repeating of the timing sequence of changes in current 24.

If the first control unit 28 signals the fault 40, the output unit 48 closes a switch 66 and passes on the state 34 directly to the output stage unit 64. Of course, the fault 40 can also be determined in some other way.

Figure 8:
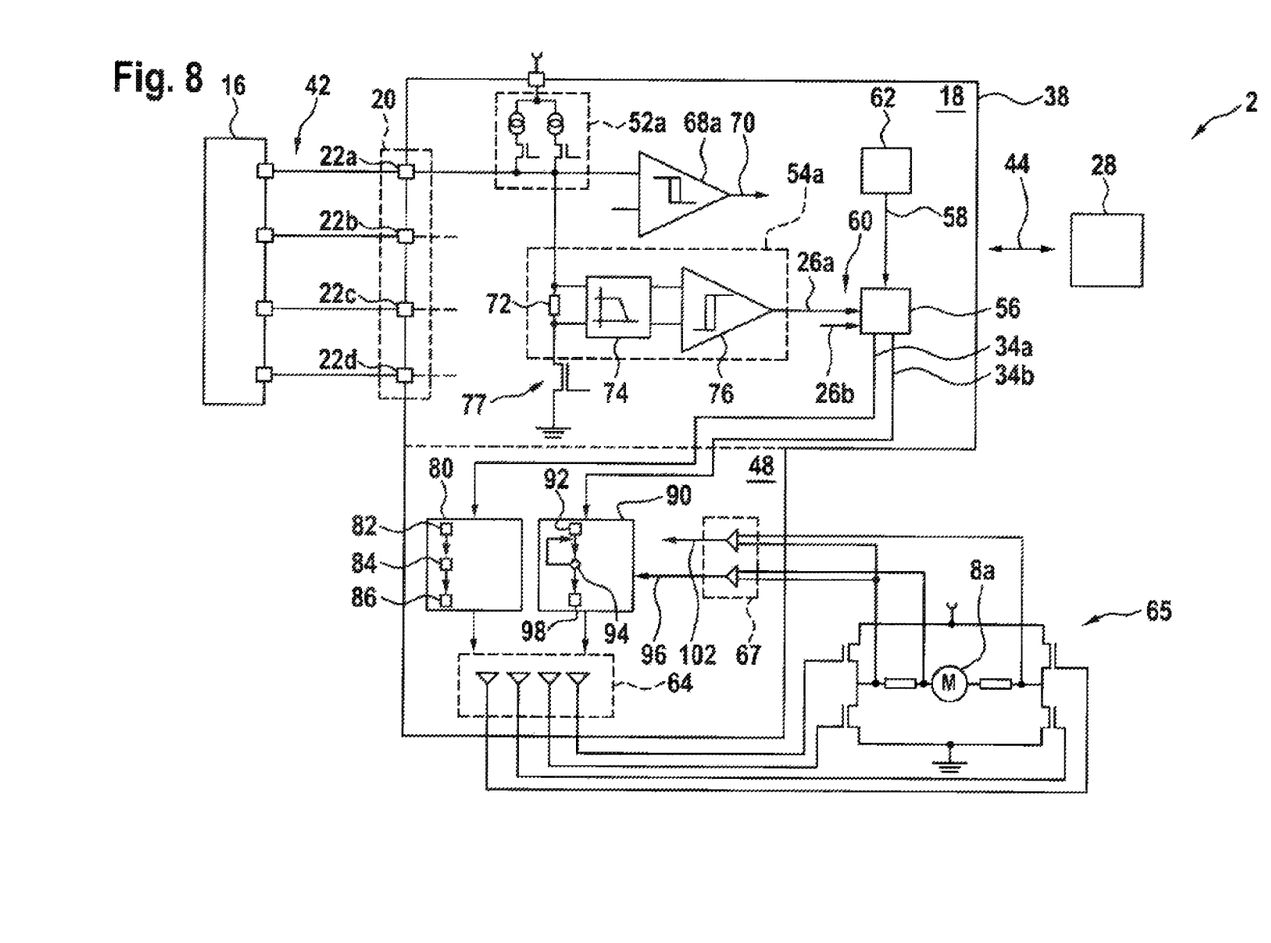

FIG. 8 shows a schematic block diagram of the parking brake 2. The switchable power source 52a and the current-measuring element 54a are connected to the terminal 22a, which is illustrated by way of example. The switchable power source 52a comprises two power sources which are arranged in parallel and can be connected and disconnected. A comparator unit 68a compares the voltage level at the terminal 22a with a voltage supply level or a ground level and therefore determines a short-circuit signal 70 for the purpose of diagnosis and switching off. The current measurement-element 54*a* comprises a measuring shunt 72, a low-pass element 74 and a comparator 76 which makes available the current measurement 26*a* in bit form. Between the ground and the current-measuring element 54*a* there is a current limiter 77. The output stage element 64 comprises a number of output stages which are designed to switch individual switches of power electronics 65 for the actuator 18*a*. A measurement element 67 serves to determine an actuator current 96 which flows through the actuator 18*a*, in particular an electric motor, to determine an actuator voltage 102 which drops across a region of the circuit comprising the actuator 18*a*.

If the comparator unit 56 determines, as a function of the fed bit pattern 60, a state 34*a* of the operator control element 16 which constitutes an opening command for the parking brake 2, the output stage unit 64 is operated in the emergency operating mode according to a sequence 80. This sequence 80 comprises, in a first step 82, operating the actuator 8*a* to open the parking brake 2. In a second step 84, the sequence 80 waits for a time period until a time threshold value is reached. In a third step 86 the actuator 18*a* is switched off. The parking brake 2 therefore enables rotation of the wheels 4.

If the comparator unit 56 determines, as a function of the fed bit pattern 60, a state 34*b* of the operator control element 16 which constitutes a closing command for the parking brake 2, the output stage unit 64 is operated in the emergency operating mode according to a sequence 90. The sequence 90 comprises, in a first step 92, the operation of the actuator 8*a* to close the parking brake 2. In a second step 94 the actuator current 96 is monitored. If the actuator current 96 exceeds a predetermined threshold value for a predetermined minimum time period of, for example, 30 ms, in a step 98 the actuator 8*a* is switched off. The parking brake 2 is therefore closed and interlocks the wheels 4.

The emergency operating mode illustrated in FIG. 8 differs from the normal operating mode to the effect that in the normal operating mode the first control unit 28 operates the output stage unit 64 as a function of the actuator voltage 102, the actuator current 96 and the state 34 of the operator control element 16. The actuator voltage 102, the actuator current 96 and the state 34 of the operator control element 16 are available to the first control unit 28 via the bus system 44.

Figure 9:
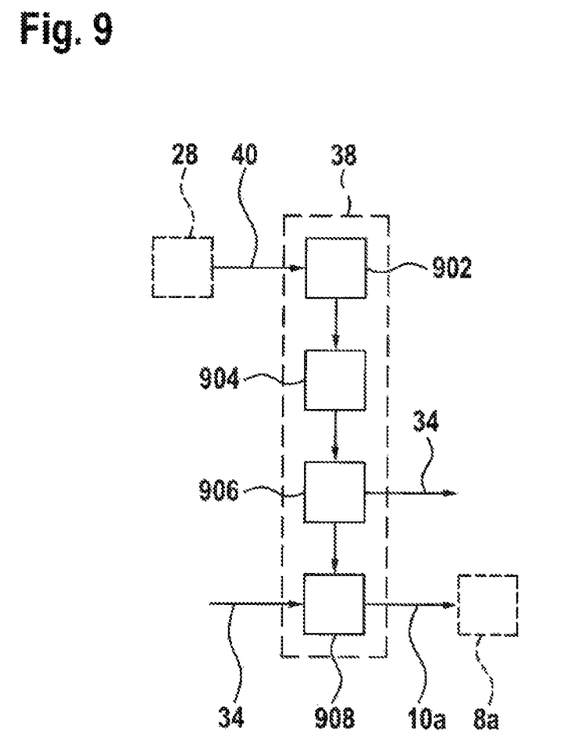
FIG. 9 shows a schematic flowchart.

FIG. 9 shows an exemplary flowchart for operating the second control unit 38. A fault 40 is determined with respect to the first control unit 28. This means that within the second control unit 38 it is detected that the first control unit 28 is no longer suitable for operating the parking brake 2, or that this fault 40 is fed to the second control unit 38, i.e. the second control unit 38 receives, in a step 902, and therefore determines said fault 40. Consequently, the determination of the fault 40 can take place in different ways. For example, the first control unit 28 itself monitors and communicates the fault 40 to the second control unit 38. The second control unit 38 receives the fault 40 in the step 902. In a further example, the first control unit 28 is monitored by a monitoring unit such as, for example, a watchdog, and the monitoring unit checks for example with an enquiry-response schema, the functional capacity of the first control unit 28. The monitoring unit is, for example, integrated in the second control unit 38.

If the fault 40 is present in the second control unit 38, a second control unit 38 is transferred, in a step 904, into the emergency operating mode and is operated therein. In the emergency operating mode, the second control unit 38 determines, in a step 906, the state 34 for the operator control element of the parking brake, wherein the state 34 corresponds to the driver's request to operate the parking brake. In a step 908, the second control unit 38 operates the actuator 8*a* with the control signal 10*a* as a function of the state 34 of the operator control element 16. Correspondingly, even in the event of a failure of the first control unit 28, which operates the actuator 8*a* in a normal operating mode, an emergency operating mode is made available by means of which the second control unit 38 can operate the actuator 8*a* with a reduced functional scope. The functional scope which is made available by the first control unit 28 in the normal operating mode comprises, for example, precise evaluation of the signals of the power electronics and outputting of control signals 10 which is correspondingly finely adjusted thereto, while the reduced functional scope which is made available by the second control unit 38 in the emergency operating mode makes available a less precise evaluation of the signals of the power electronics and correspondingly only basic functions of the parking brake 2 with control signals 10. For electric vehicles which do not have a transmission interlock, this constitutes an improvement, since the proposed increasing of the availability of the parking brake ensures a stopping capability of the vehicle. Of course, the increased availability is also advantageous in vehicles comprising a transmission interlock.

What is claimed is:

1. A method for operating an electric parking brake, comprising:
   determining, with a second controller, a state of an operator control element of the electric parking brake;
   transmitting, in a normal operating mode, the state of the operator control element to a first controller, the first controller being configured to operate the electric parking brake in the normal operating mode;
   detecting a fault relating to the first controller;
   operating the second controller in an emergency operating mode in response to detecting the fault;
   operating, in the emergency operating mode, the electric parking brake with the second controller as a function of the state of the operator control element.

2. The method according to claim 1, further comprising:
   operating the electric parking brake to engage in response to a first state of the operator control element indicating that the electric parking brake should be engaged; and
   switching off an actuator of the electric parking brake, with the second controller, in response to an actuator current reaching a predetermined threshold value.

3. The method according to claim 2, further comprising:
   switching off the actuator of the electric parking brake, with the second controller, in in response to the actuator current reaching the predetermined threshold value for a predetermined minimum time period.

4. The method according to claim 3, wherein the predetermined minimum time period is at least 30 ms.

5. The method according to claim 2, the operating the electric parking brake with the second controller as the function of the state of the operator control element further comprising:
   operating the electric parking brake to disengage in response to a second state of the operator control element indicating that the electric parking brake should be disengaged; and
   switching off the actuator of the electric parking brake, with the second controller, after a predetermined time threshold value has been reached since the electric parking brake was disengaged.

6. The method according to claim 1, further comprising:
operating, in the normal operating mode, the electric parking brake with the first controller as a function of the determined state of the operator control element.

7. A backup control unit for a control device for operating an electric parking brake, comprising:
an input unit configured to (i) determine a state of an operator control element, and (ii) in a normal operating mode, transmit the state to a main control unit, the main control unit being configured to operate the electric parking brake in the normal operating mode; and
an output unit configured to (i) in the normal operating mode, receive an actuator command from the main control unit and operate the electric parking brake as a function of the actuator command, and (ii) in an emergency operating mode, receive the state from the input unit and operate the electric parking brake as a function of the state,
wherein the backup control unit is configured to operate in the emergency operating mode in response to detect a fault relating to the main control unit.

8. A motor vehicle without a transmission interlock comprising:
a parking brake including one or more actuators;
an operator control element;
a main control unit configured to operate the electric parking brake in a normal operating mode; and
a backup control unit including:
an input unit configured to (i) determine a state of the operator control element, and (ii) in a normal operating mode, and transmit the state to the main control unit; and
an output unit configured to (i) in the normal operating mode, receive an actuator command from the main control unit and operate the electric parking brake as a function of the actuator command, and (ii) in the emergency operating mode, receive the state from the input unit and operate the electric parking brake as a function of the state,
wherein the backup control unit is configured to operate in the emergency operating mode in response to detect a fault relating to the main control unit.

\* \* \* \* \*

UNITED STATES PATENT AND TRADEMARK OFFICE
CERTIFICATE OF CORRECTION

PATENT NO. : 10,532,724 B2
APPLICATION NO. : 15/978912
DATED : January 14, 2020
INVENTOR(S) : Peter Rebholz-Goldmann

Page 1 of 1

It is certified that error appears in the above-identified patent and that said Letters Patent is hereby corrected as shown below:

In the Claims

In Claim 11, at Column 8, Lines 9-10: "operating mode, and transmit" should read --operating mode, transmit--.

Signed and Sealed this
Twenty-fourth Day of March, 2020

Andrei Iancu
*Director of the United States Patent and Trademark Office*